Feb. 19, 1935.   M. W. GANO, JR   1,991,611
VACUUM DOOR CLOSER FOR AUTOMOBILES AND THE LIKE
Filed March 14, 1934   2 Sheets-Sheet 1
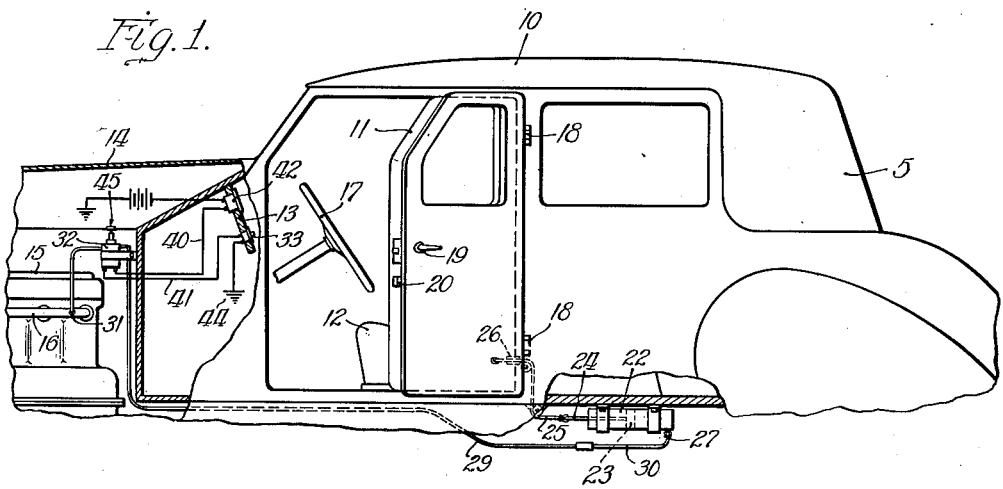
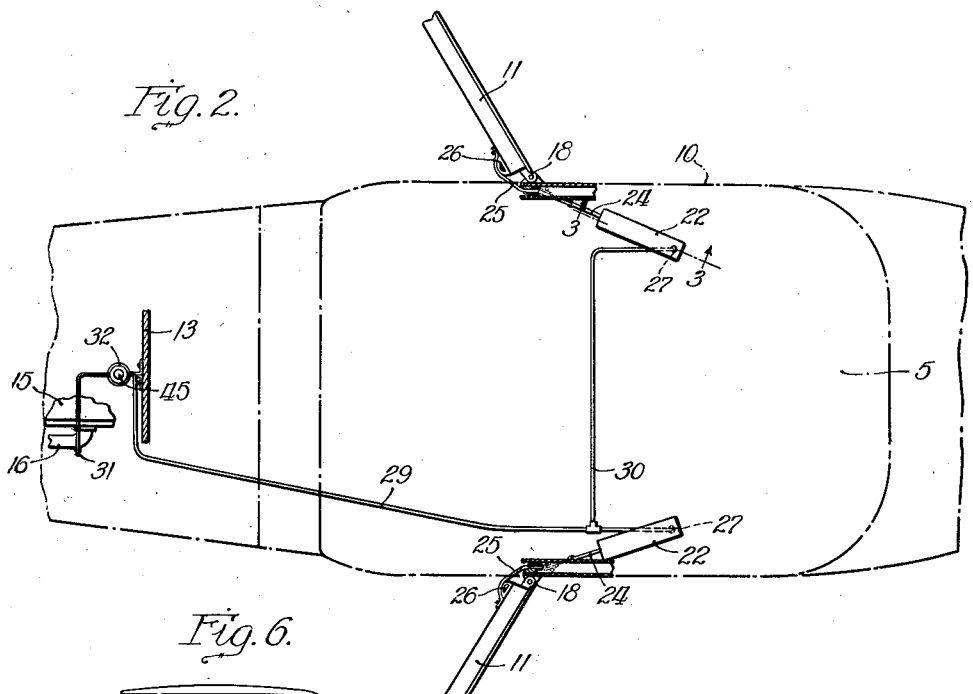
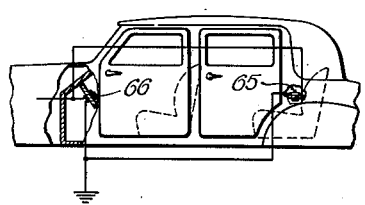
Inventor:
Merritt W. Gano, Jr.
By Brown, Jackson, Boettcher & Dienner
Attys.

Feb. 19, 1935.   M. W. GANO, JR   1,991,611
VACUUM DOOR CLOSER FOR AUTOMOBILES AND THE LIKE
Filed March 14, 1934    2 Sheets-Sheet 2
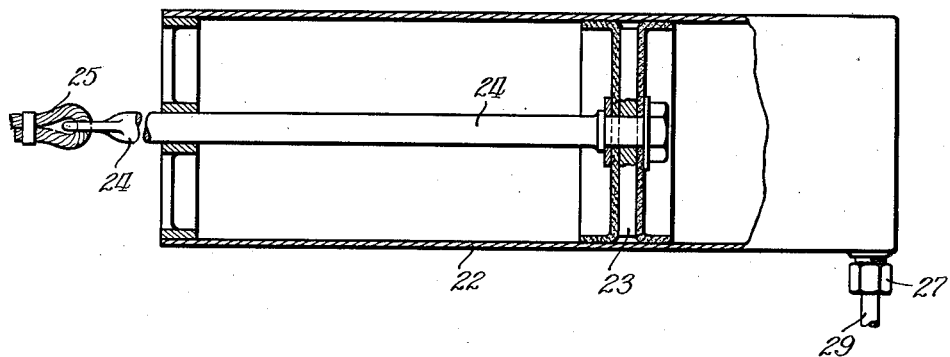
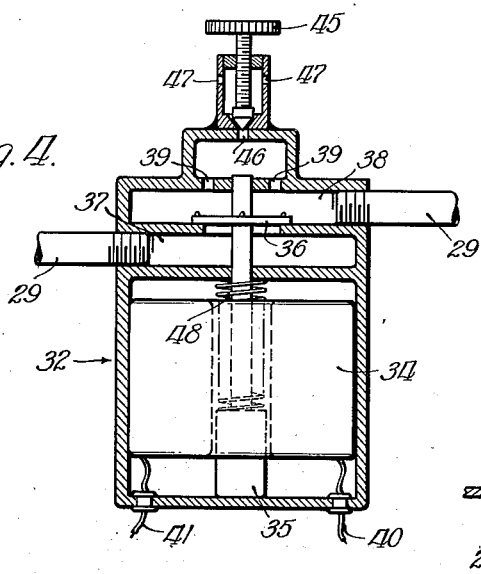
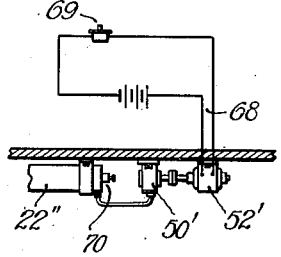
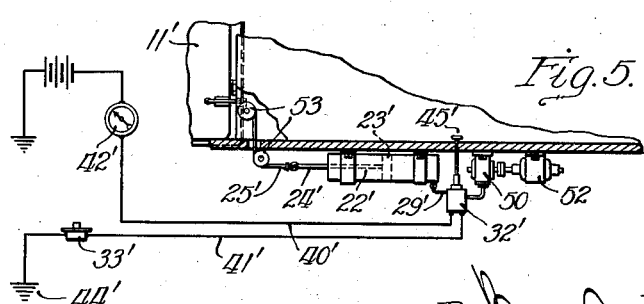
Inventor:
Merritt W. Gano, Jr.
By: Brown, Jackson, Boettcher & Dienner
Atty Patented Feb. 19, 1935

1,991,611

UNITED STATES PATENT OFFICE 1,991,611

VACUUM DOOR CLOSER FOR AUTOMOBILES AND THE LIKE

Merritt W. Gano, Jr., Denver, Colo.

Application March 14, 1934, Serial No. 715,419

5 Claims. (Cl. 296—44)

This invention relates to door closing means and has especial reference to an improved closing arrangement for the doors of automobiles and like vehicles, whereby the door or doors may be closed from remote position within the vehicle, and particularly by the driver from his position in the driver's seat.

The principal feature of the present invention is the convenience afforded, especially in the case of women drivers, as it has been almost impossible heretofore to sit in the driver's seat of a modern automobile and reach and close a door remote therefrom without sliding over into the passenger's seat to do so.

Furthermore, if a door is left ajar and the car started in motion, the door will swing open into position to be struck and damaged by a passing car or other object alongside the path of movement of the vehicle. If the driver attempts to reach and close the door from his position in the driver's seat, particularly if the door is a rear door, or even a front door on the side opposite the driver's position, he is likely to lose control of the vehicle. And it may be difficult for some other occupant to reach and close the door in time to avoid an accident.

The present invention has for one of its objects the provision of a vacuum operated door closer having suction operated means connected to the door or doors of the vehicle and operable to close the same upon application of suction thereto, a suction line connected to the suction operated means and adapted for connection with a suction inducing means, preferably the intake manifold of the engine of the vehicle, and means in the suction line and operable from position within the vehicle remote from the door and preferably from position in the driver's seat for controlling the application of suction to the suction operated means to close the door or doors from the driver's seat or other remote position.

Another object is the provision of a door closing device of the character referred to which is reliable in use, easily controlled, and comparatively simple and inexpensive to manufacture and install, being so arranged that it can be built into the automobile or other vehicle in its manufacture with little added expense, or even applied to existing cars.

Further objects and the advantages and details of the illustrated embodiments of the invention will appear from the following detail description, taken in connection with the accompanying drawings, in which:

Figure 1 is a fragmentary side elevational view of an automobile, partially broken away and in section, and showing an embodiment of the present invention applied thereto;

Figure 2 is a fragmentary diagrammatic plan view of the vehicle and door closer means shown in Figure 1;

Figure 3 is a detail section through one of the suction operated devices at the doors, taken on the line 3—3 of Figure 2;

Figure 4 is a sectional view through the electromagnetic valve;

Figure 5 is a fragmentary sectional view showing another embodiment of the invention;

Figure 6 is a fragmentary side elevational view showing a four-door vehicle with a rear switch control in parallel with the front switch control at the driver's seat; and Figure 7 is a fragmentary detail view showing another form of control for the embodiment of the invention illustrated in Figure 5.

Referring to the drawings, the body 10 of the vehicle shown is of the two-door type having doors 11 at opposite sides of the front seats 12, one of which may be adapted to be folded down to allow exit and entrance to the rear seat in the tonneau 5.

It is to be understood, of course, that the particular body and door arrangement shown is merely illustrative of one existing type of body and door arrangement to which the present invention is adapted to be applied. The invention may be applied to any other body and door arrangement as suitable or desired. Where there are rear doors, the suction operated closing devices will be applied to the rear doors in the manner in which they are applied to the doors 11 in the embodiment illustrated. And the invention may be applied to one or all doors, or to any desired combination of the doors of the vehicle.

Forwardly of the front seat 12 is the usual instrument panel 13, and at 14 is the hood within which is the internal combustion engine 15. The engine 15 has the usual intake manifold 16, and the steering wheel 17 is positioned in the usual manner adjacent the driver's seat.

The doors 11 are hinged at 18 to be swung to open and closed positions, and each has a handle 19 and, preferably, the usual snap latch mechanism 20 for holding the door closed. Door locks may be provided as suitable or desired.

The door closer comprises relatively small cylinders 22, one disposed adjacent each door 11. These cylinders may be placed behind the upholstery or, in cases where the front and rear doors are swung from the center upright, the cylinders may be placed beneath the car or elsewhere as desired, and the pull exerted on the doors by running flexible cables over pulleys and down through the paneling for connection with the cylinders below.

In the illustrated embodiment, a piston or plunger 23 is operable within each cylinder 22, and each piston 23 has a rod 24 extending out and connected by a flexible cable 25 to the adjacent door 11. The flexible cable, wire, or other flexible element 25, runs through the door sill and may be trained over pulleys as suitable or desired. At its door end, it may operate around a cam-like abutment 26 on the door. Instead of flexible cable connections, suitable linkage or other connections may be employed between the plungers 23 and the doors 11 within the scope of the present invention. Each type of door will probably have to have a distinct layout of its own, and the broader of the appended claims are intended to cover the invention irrespective of the details of the particular layout for applying the same to a particular door, so that there may be a wide range of such variations within the scope of these claims.

The opposite ends of the cylinders 22 are connected at 27 to a pipe or suction line 29. The suction line 29 is branched at 30 for connection to the respective cylinders 22, and at 31 is connected to the intake manifold 16 whereby the suction or vacuum created by the engine 15 is utilized for closing the door or doors 11. The application of vacuum or suction to the cylinders 22, or other suction operated devices at the doors, is controlled by an electromagnetic valve 32 under control, for example, of a switch 33 on the instrument panel 13, as shown, or in any other convenient location within easy reach of the driver's hand.

In the case of automobiles having four doors, as shown in Figure 6, a push-button or other suitable control 65 in parallel with the push-button switch 66, which corresponds with the push-button switch 33 of Figures 1 and 2, may be placed in the tonneau within easy reach of the occupants of the rear seat. In this way, the rear doors may be closed from the rear compartment as well as from the driver's position.

The electromagnetic valve 32 has a coil 34 surrounding a plunger 35 which, when the current is turned on, is raised to the center position of the coil, thus opening the valve 36 and placing the suction applying side 37 of the valve, which is connected by one section of the pipe 29 to the intake manifold 16, in communication with the side 38, which is connected by another section of the pipe 29 to the cylinders 22. And, at the same time, the valve 36 closes the air vents at 39 for venting air into the pipes leading to the cylinders 22. At 40 and 41 are wires leading from the coil 34 of the electromagnetic valve to the ammeter 42 on the instrument panel 13 for the positive wire and to the switch 33 and then grounded at 44 for the ground side. The valve device has a thumb-screw 45 for adjusting the air vent or bleeder action through the ports 39, these ports communicating with atmosphere through the port 46 controlled by the thumb-screw 45 and outer ports 47. The adjustable thumb-screw 45 is for regulating the release mechanism, and with this adjustment the releasing air may be adjusted to act as a door check when the door swings to open position. When the current is released the plunger 35 returns to its original position, as shown, with the aid of a coil spring 48. The spring may be omitted and the weight of the core relied on to return the valve 36 to closed position, as shown.

From the foregoing, it will now be apparent that with the door or doors in open position the driver merely presses the push-button 33 to energize the coil 34 of the electromagnetic valve. This energization of the coil 34 raises the valve 36 to place the suction applying side 37 in communication with the side 38 connected to the cylinders 22 and closes the ports 39. Suction is thereupon applied to the right-hand sides of the plungers 23 (Figure 3) from the intake manifold 16 of the engine, drawing these plungers to the right as viewed in Figure 3, and thereby swinging the door or doors 11 to closed position where the snap latch mechanism 29 operates to hold the same in closed position. Upon deenergization of the coil 34, the plunger 35 returns to the position shown in Figure 4, closing off the intake manifold from the cylinders 22 and opening the line leading from the electromagnetic valve 32 to the cylinders 22 to atmosphere through the ports 39. When the door is opened, the plunger 23, connected thereto, is moved to the left in the cylinder 22, as viewed in Figure 3, so that the closing operation may be repeated by operating the switch 33, and with the ports 39 open the air may act as a door check in the opening movement of the door.

The embodiment of the invention illustrated in Figure 5 is similar to the embodiment illustrated in Figures 1 to 4, except that in this case the suction inducing means is in the form of a vacuum pump 50 operated by a small six-volt electric motor 52. The cylinder 22' is connected to the vacuum pump 50 by the pipe or suction line 29' and the electromagnetic valve device 32' may be interposed in this suction line, as before. The extending rod 24' of the plunger 23' is connected by the cable or other flexible element 25' to the door 11', and the cable is extended through the paneling or otherwise and may be trained over pulleys 53. One side of the coil of the electromagnetic valve 32' is connected by a wire 40' with the ammeter 42', and the other side is connected through the push-button switch 33' to ground at 44'. The adjusting screw 45' for the electromagnetic valve 32' may extend upwardly through the floor board, as shown, or may extend laterally or otherwise for access beneath the car.

Instead of arranging the electromagnetic valve device 32' in the suction line 29' of the embodiment shown in Figure 5, this embodiment of the invention may be controlled by a circuit 68 from the motor 52' to a switch 69 adjacent the driver's seat or other remote position within the vehicle, as shown in Figure 7. The switch 69 may be of the push-button or any other suitable type, and its operation closes the motor circuit starting the motor 52' which immediately starts the pump 50' and produces suction in the cylinders 22''. A small adjustable air bleeder valve 70 at the end of each cylinder 22' in this case takes the place of the breather valve incorporated in the electromagnetic switch of the previous embodiments.

It is to be understood that, instead of the cylinders and suction-operated plungers or pistons at the respective doors, these suction-operated devices may be in the form of diaphragm devices within the scope of the broader of the appended claims, although the cylinder and piston form of devices are preferable because of the relatively great operating range which they provide for closing the doors from substantially any open position.

I claim:

1. In combination, a vehicle having a body, a door for said body hinged to be swung to open and closed positions and provided with the usual snap latch mechanism for holding the door closed and with the usual handle for opening and closing the door from inside and outside the vehicle, a cylinder stationary with respect to the body of the vehicle and supported independently of the door and in proximity thereto, a piston operable within said cylinder, a flexible element extending into one end of the cylinder and connecting the door to one end of the piston, a source of suction connected to the other end of the cylinder for applying suction to the other end of the piston, and a two-way valve operable from within the vehicle and connected into said line and in one position connecting the source of suction to the cylinder to close said door by suction from said source of suction and in the other position completely disconnecting the suction from said cylinder to permit said door to be held in closed position in the usual manner solely by means of said latch mechanism and to be opened and closed in the usual manner by means of said handle and entirely independently of the door closing cylinder and piston and the suction line therefor.

2. In combination, a vehicle having a body, a door for said body hinged to be swung to open and closed positions and provided with the usual snap latch mechanism for holding the door closed and with the usual handle for opening and closing the door from inside and outside the vehicle, a cylinder stationary with respect to the body of the vehicle and supported independently of the door and in proximity thereto, a piston operable within said cylinder, a flexible element extending into one end of the cylinder and connecting the door to one end of the piston, a source of suction connected to the other end of the cylinder for applying suction to the other end of the piston, a two-way valve operable from within the vehicle and connected into said line and in one position connecting the source of suction to one end of the cylinder to close said door by suction and in the other position completely disconnecting the suction from said cylinder to permit said door to be held in closed position in the usual manner solely by means of said latch mechanism and to be opened and closed in the usual manner by means of said handle and entirely independently of the door closing cylinder and piston and the suction line therefor, and bleeder means for venting to atmosphere in said last position of said valve the end of the cylinder to which suction is applied for closing said door.

3. In combination, a vehicle having a body, a door for said body hinged to be swung to open and closed positions and provided with the usual snap latch mechanism for holding the door closed and with the usual handle for opening and closing the door from inside and outside the vehicle, a cylinder stationary with respect to the body of the vehicle and supported independently of the door and in proximity thereto, a piston operable with said cylinder, a flexible element extending into one end of the cylinder and connecting the door to one end of the piston, a source of suction connected to the other end of the cylinder for applying suction to the other end of the piston, a two-way valve operable from within the vehicle and connected into said line and in one position connecting the source of suction to one end of the cylinder to close said door by suction and in the other position completely disconnecting the suction from said cylinder to permit said door to be held in closed position in the usual manner solely by means of said latch mechanism and to be opened and closed in the usual manner by means of said handle and entirely independently of the door closing cylinder and piston and the suction line therefor, bleeder means for venting to atmosphere in said last position of said valve the end of the cylinder to which suction is applied for closing said door, the suction in said cylinder acting as a door check in the opening of the door, and means for adjusting said bleeder means to adapt the door check action of the suction in one end of the cylinder to the individual weight of the door.

4. In combination, a vehicle having a body, a door for said body hinged to be swung to open and closed positions and provided with the usual snap latch mechanism for holding the door closed and with the usual handle for opening and closing the door from inside and outside the vehicle, suction means, and means for applying suction from said suction means to close said door from remote position within the vehicle and for releasing from position within the vehicle the door entirely from said suction to permit the door to be held in closed position in the usual manner solely by means of said latch mechanism and to be opened and closed in the usual manner by means of said handle and entirely independently of said suction means.

5. In combination, a vehicle having a body, a driver's seat, a rear seat, a plurality of doors provided with the usual snap latch mechanism for holding the door closed and with the usual handle for opening and closing the door from inside and outside the vehicle, suction means, and means comprising a pair of control devices, one adjacent the driver's seat and the other disposed for access from the rear seat, each of said devices being adapted to apply suction from said suction means to close said doors from different remote positions within the vehicle and for releasing from position within the vehicle the doors entirely from said suction to permit the doors to be held in closed position in the usual manner solely by means of said latch mechanism and to be opened and closed in the usual manner by means of said handles and entirely independently of said suction means.

MERRITT W. GANO, Jr.